UNITED STATES PATENT OFFICE.

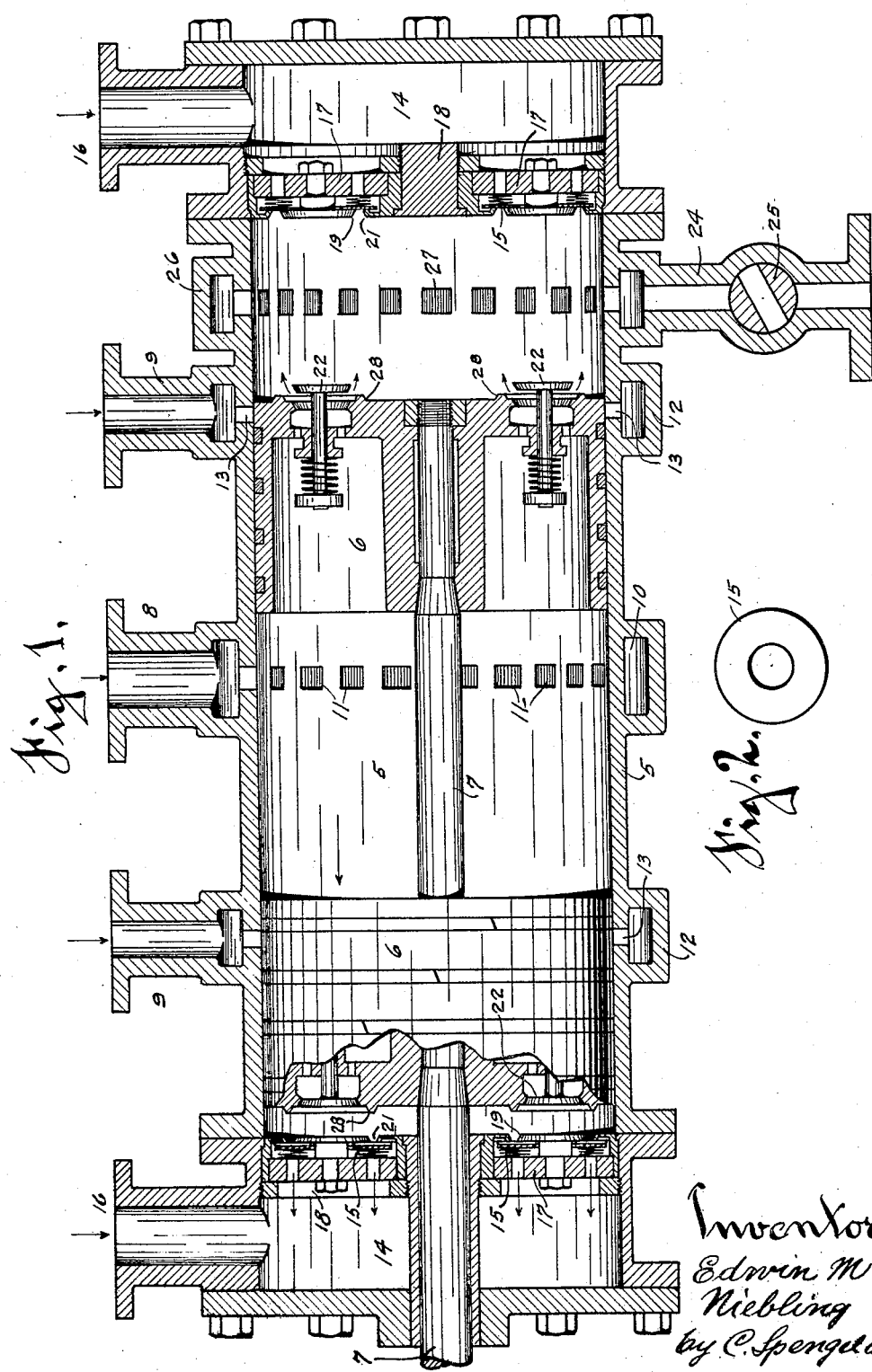

EDWIN M. NIEBLING, OF CINCINNATI, OHIO.

COMPRESSION-PUMP.

1,234,684.  Specification of Letters Patent.  Patented July 24, 1917.

Application filed August 11, 1915. Serial No. 45,012.

*To all whom it may concern:*

Be it known that I, EDWIN M. NIEBLING, residing at Cincinnati, Hamilton county, State of Ohio, have invented certain new and useful Improvements in Compression-Pumps, of which the following is a clear, full, and exact description, attention being called to the drawing which accompanies this application and forms a part thereof.

This invention concerns compression pumps used for moving fluids like gases or air. It contemplates a construction of such pumps whereby they are enabled to move gases of different pressures, as for instance in refrigerating plants where ammonia gas or any other refrigerating agent serves to produce different temperatures in different parts of the establishment as may be required to suit particular purposes. The fluid is compressed by the compressor to required density and then conducted to the various parts of the plant where it is to be used, and where, by means of regulating valves, it is permitted to expand to the reduced density which may be needed to produce the particular temperature for each part. The pressure of the gas is thereby correspondingly reduced and after having done its work it returns to the suction side of the compressor at this reduced pressure, to be compressed again.

The invention consists of the general construction of such a compressor and of certain parts of the same as will be described more fully hereinafter and pointed out in the claims.

The invention is also illustrated in the accompanying drawing in which:

Figure 1. shows my improved compressor in longitudinal section.

Fig. 2. shows one of the valves used for discharging the compressed gas.

In the drawing numeral 5 indicates the cylinder of the compressor. 6 indicates two pistons mounted upon a piston-rod 7, and moved back and forth in the cylinder by any customary means.

Inlets to the cylinder are provided through which the gas, expanded after having done its work, is received. Admission for gas at three different pressures is provided for and pipe connection may be made at three different points represented by three attaching nipples shown respectively at 8 and 9—9. Nipple 8 permits connection of a pipe leading in midway between the ends of the cylinder and is intended to receive gas at the lowest pressure. Nipples 9—9, one between nipple 8 and each end of the cylinder are intended to permit connection of pipes receiving gas at higher pressure.

The pressure in these two latter pipes may be alike, or in one it may be different from that in the other.

The gas from each of these three pipes enters by preference first annular ducts from which in each case it enters the cylinder through a number of ports in the side of the same. Numeral 10 indicates the duct for the central nipple 8, and 11 are the ports opening from this duct into the cylinder. 12 indicates the ducts for nipples 9—9, and 13—13 are the ports leading from them into the cylinder.

At each end of the cylinder there are discharge chambers 14 which chambers receive the gas, after compression by the piston, through openings controlled by discharge valves 15. The compressed gas passes off through pipes connected to nipples 16 which may lead off, each independently, or be connected first by a side-pipe as required. Valves 15, of which there may be four in each end, are of a type known as "plate valves." They are contained in cages 17 inserted in the cylinder heads 18 and by springs are kept seated against two spaced concentric shoulders 19 and 21 which form part of these cages. The valves are arranged to yield outwardly, the gas passing out into chambers 14 through the annular space between these two shoulders.

The pistons are hollow and open at their inner ends, so as to be in open communication with ports 11. In their outer ends these pistons have openings controlled by suction valves 22, four being presumed, kept seated by springs and arranged to open outwardly with reference to the hollow piston.

The operation is as follows:

The piston which recedes from the cylinder-end opposite it, (end at right in the drawing) creates thereby a suction in the space between it and said end which causes the valves in the piston to open and to draw gas from the space between the pistons, which gas comes from ports 11. As the piston on the right approaches the end of its stroke inwardly, it also uncovers ports 13 and gas from these ports, which is at higher pressure than that from ports 11, enters at once the same space outside of the piston.

When the piston moves in opposite direction so as to approach the end of the cylinder, as is shown at the left end in the drawing, it compresses the gas received from these two sources, and expels it through valves 15, the valves in the piston being then closed.

The admission of the high-pressure gas may also be arranged so that it occurs before the piston approaches the end of its stroke. In that case nipples 9, or one of them, would be positioned as shown at 24 and lead to a duct 26 from which, by ports 27, communication is had with the cylinder.

Furthermore this admission may be valve-controlled for which purpose a valve 25 is provided in the admission nipple, which valve is operated manually or by any suitable mechanism, actuated by one of the moving parts of the compressor, or by a customary eccentric, operated by the main shaft of the pump. Such a valve-controlled admission nipple may take the place of one or both nipples 9 or it may be additional thereto. The means for operating valve 25 may be adjustable in a manner so that the gas may be admitted sooner or later, meaning more or less of it as conditions may require.

In the interest of economical operation, it is essential that all the compressed gas ahead of the piston is expelled, otherwise on the return stroke of the piston, any gas remaining reëxpands and by its presence in the cylinder reduces the receiving capacity of the same during the next piston stroke.

For such purpose I provide annular displacing ridges 28 on the outer ends of the pistons which are adapted to move against the plate valves and into the space between shoulders 19 and 21, thereby displacing the gas and forcing it out completely. This feature of the construction may be used with plate-valves generally.

A customary cooling jacket whereby such cylinders are surrounded has been omitted.

Having described my invention, I claim as new:

1. In a compressor, the combination of a cylinder, valve-controlled gas-outlets in each of its ends, pistons coupled together with a space between them, reciprocating between these ends, a central inlet midway between the ends of the cylinder to admit gas at low pressure to the cylinder-space between the pistons, an additional inlet between this central inlet and each end of the cylinder to admit gas at high pressure into each of the spaces between each end of the cylinder outside of each piston, openings in each piston to permit gas from the space between the pistons to pass into the spaces outside of them and between them and the ends of the cylinder and spring-actuated valves to control these openings.

2. In a compressor, the combination of a cylinder having valved discharge-openings in each of its ends and gas inlets in its side, spaced longitudinally, one in the center to admit gas at low pressure and one between each end and the center inlet to admit gas at high pressure, a valve to control admission of the high pressure gas, customary means to manipulate this valve, a piston reciprocating in the cylinder and valved openings in the piston adapted to permit the gas in the cylinder on the low pressure side of the piston to pass through the same toward the discharge openings.

In testimony whereof, I hereunto affix my signature, this 7th day of August, 1915, in the presence of two witnesses.

EDWIN M. NIEBLING.

Witnesses:
C. SPENGEL,
A. JOHNSON.